(12) United States Patent
Mehr et al.

(10) Patent No.: US 11,323,404 B2
(45) Date of Patent: *May 3, 2022

(54) SYSTEM AND METHOD FOR DISPLAYING MESSAGE OR USER LISTS

(71) Applicant: Zoosk, Inc., Berlin (DE)

(72) Inventors: Alexander F. Mehr, San Francisco, CA (US); Shayan G. Zadeh, San Francisco, CA (US); Jared R. Crane, San Francisco, CA (US); Janet Ryu, San Francisco, CA (US); Eric R. Barnett, Menlo Park, CA (US); Charles E. Gotlieb, San Francisco, CA (US)

(73) Assignee: Zoosk, Inc., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/109,131

(22) Filed: Dec. 1, 2020

(65) Prior Publication Data
US 2021/0194842 A1  Jun. 24, 2021

Related U.S. Application Data

(63) Continuation of application No. 14/643,561, filed on Mar. 10, 2015, now Pat. No. 10,855,636.

(60) Provisional application No. 61/953,901, filed on Mar. 16, 2014, provisional application No. 61/950,764, filed on Mar. 10, 2014.

(51) Int. Cl.
*H04L 12/58* (2006.01)
*G06Q 10/10* (2012.01)
*G06Q 50/00* (2012.01)
*H04L 51/42* (2022.01)
*H04L 51/52* (2022.01)
*H04L 51/00* (2022.01)

(52) U.S. Cl.
CPC .......... *H04L 51/22* (2013.01); *G06Q 10/10* (2013.01); *G06Q 50/01* (2013.01); *H04L 51/00* (2013.01); *H04L 51/16* (2013.01); *H04L 51/32* (2013.01)

(58) Field of Classification Search
CPC ........ H04L 51/22; H04L 51/00; H04L 51/16; H04L 51/32; G06Q 10/10; G06Q 50/01
USPC .................................................... 709/206
See application file for complete search history.

(56) References Cited

U.S. PATENT DOCUMENTS

| | | | |
|---|---|---|---|
| 6,735,568 B1 * | 5/2004 | Buckwalter | G06Q 30/02 705/319 |
| 9,596,196 B1 * | 3/2017 | Hills | H04L 51/16 |
| 2004/0119752 A1 * | 6/2004 | Beringer | G06Q 10/06313 715/779 |
| 2004/0260781 A1 * | 12/2004 | Shostack | G06Q 30/02 709/207 |
| 2005/0171954 A1 * | 8/2005 | Hull | H04L 51/32 |
| 2006/0168059 A1 * | 7/2006 | Chang | G06Q 30/00 709/206 |
| 2007/0086592 A1 * | 4/2007 | Ellison | H04L 9/3247 380/282 |
| 2008/0086431 A1 * | 4/2008 | Robinson | A63F 13/12 706/11 |

(Continued)

*Primary Examiner* — Nicholas R Taylor
*Assistant Examiner* — Chong G Kim
(74) *Attorney, Agent, or Firm* — Innovation Partners LLC; Charles E. Gotlieb (57) ABSTRACT

A system and method displays lists of users or messages in segments, with some segments showing messages or users believed to be more relevant to the user than others on the list.

21 Claims, 3 Drawing Sheets

(56) References Cited

U.S. PATENT DOCUMENTS

| | | | |
|---|---|---|---|
| 2008/0086534 A1* | 4/2008 | Bardak | H04L 51/046 709/206 |
| 2009/0013054 A1* | 1/2009 | Libbey | G06Q 10/107 709/207 |
| 2010/0125632 A1* | 5/2010 | Leonard | G06Q 10/10 709/204 |
| 2010/0145869 A1* | 6/2010 | Brown | G06Q 30/06 705/319 |
| 2010/0211641 A1* | 8/2010 | Yih | G06Q 10/107 709/206 |
| 2011/0060803 A1* | 3/2011 | Barlin | G06Q 30/02 709/206 |
| 2011/0119258 A1* | 5/2011 | Forutanpour | H04L 51/28 707/723 |
| 2012/0023113 A1* | 1/2012 | Ferren | G06F 16/9535 707/751 |
| 2012/0047267 A1* | 2/2012 | Mehr | G06Q 30/0623 709/226 |
| 2012/0110085 A1* | 5/2012 | Malik | G06F 16/2228 709/205 |
| 2012/0136877 A1* | 5/2012 | Zadeh | G06Q 10/06311 707/749 |
| 2012/0259725 A1* | 10/2012 | Wehmeier | G06Q 30/06 705/26.4 |
| 2012/0290978 A1* | 11/2012 | Devecka | G06Q 30/0277 715/810 |
| 2013/0018964 A1* | 1/2013 | Osipkov | G06Q 10/107 709/206 |
| 2013/0086180 A1* | 4/2013 | Midgen | G06F 3/04842 709/206 |
| 2014/0012927 A1* | 1/2014 | Gertzfield | G06F 16/252 709/206 |
| 2014/0122628 A1* | 5/2014 | Yao | H04L 51/16 709/206 |
| 2014/0304615 A1* | 10/2014 | Coe | H04L 51/22 715/752 |
| 2015/0033141 A1* | 1/2015 | Mishra | H04L 51/22 715/752 |
| 2016/0156579 A1* | 6/2016 | Kaufmann | H04L 51/22 709/206 |
| 2016/0255034 A1* | 9/2016 | Yuan | H04L 51/22 709/206 |

* cited by examiner

SYSTEM AND METHOD FOR DISPLAYING MESSAGE OR USER LISTS

RELATED APPLICATIONS

This application is a continuation of U.S. Pat. No. 10,855,636 entitled, "System and Method for Displaying Message or User Lists" issued as invented by Alex Mehr, Shayan Zadeh, Jared Crane, Janet Ryu, Eric Barnett and Charles Gotlieb on Dec. 1, 2020, which claims the benefit of U.S. Provisional Patent Application Ser. No. 61/950,764 entitled, "Method and Apparatus for Displaying Message or User Lists" filed on Mar. 10, 2014 by Alex Mehr, Shayan Zadeh, Jared Crane, Janet Ryu, Eric Barnett and Charles Gotlieb and claims the benefit of U.S. Provisional Patent Application Ser. No. 61/953,901 entitled, "Method and Apparatus for Displaying Message or User Lists" filed on Mar. 16, 2014 by Alex Mehr, Shayan Zadeh, Jared Crane, Janet Ryu, Eric Barnett and Charles Gotlieb, and is related to U.S. patent application Ser. No. 13/200,299 entitled "System and Method for Selecting Compatible Users for Activities Based on Experiences, Interests or Preferences as Identified from One or More Web Services" filed on Sep. 21, 2011 by Shayan Zadeh and Alexander Mehr, which claims the benefit of U.S. Provisional Patent Application Ser. No. 61/403,735 entitled "Method and Apparatus for Selecting Compatible Users for Activities Based on Experiences, Interests or Preferences as Identified from One or More Web Services" filed on Sep. 21, 2010 by Shayan Zadeh and Alexander Mehr, each having the same assignee as the present invention and each is hereby incorporated by reference in its entirety.

FIELD OF THE INVENTION

The present invention is related to computer software and hardware and more specifically to computer software and hardware for display of lists of items.

BACKGROUND OF THE INVENTION

Users may display lists of messages or other users of a website. Conventional display of such lists is suboptimal. What is needed is a system and method that can display lists of messages or users.

SUMMARY OF INVENTION

A system and method displays lists of users or messages in segments, with some segments showing messages or users believed to be more relevant to the user than others on the list. Relevance may be determined using any or all of user characteristics the user requesting the list has explicitly indicated as being desirable, user characteristics the user has implicitly indicated as being desirable as indicated by prior actions of the user requesting the list, common interests, experiences and preferences with the user requesting the list, popularity of the users on the list as indicated by actions users, including users other than the user requesting the list, have taken with respect to the users on the list, and one or more sets of characteristics specified by the user requesting the list specifically for the purpose of viewing such lists.

There may be multiple segments into which a list is divided, for example, one that is identified without the sets of characteristics, and then one or more additional segments, with each additional segment focused more on one set of characteristics than the others, or focused entirely on that set of characteristics.

The segments may be limited to certain time periods specified by the user requesting the list, the time periods applying to the time of receipt or sending of messages on the list, or actions of the users taken that caused them to appear on the list.

If an insufficient number of users or messages appears in a segment, other users who are not on the list but would have appeared in the segment had they otherwise taken an action (e.g. sent a message within the time period specified) may be suggested to the user requesting the list, or a message may be sent to that user or those users informing them that they should in fact take the action that would have caused them to be displayed on the list (e.g. send a gift to the user requesting the list) because there is a higher likelihood of the recipient returning the interest. Such other users may be mutually matched, for example, by limiting them to other users whose explicit or implicit preferences match the user requesting the list.

DETAILED DESCRIPTION OF A PREFERRED EMBODIMENT

Figure 1:
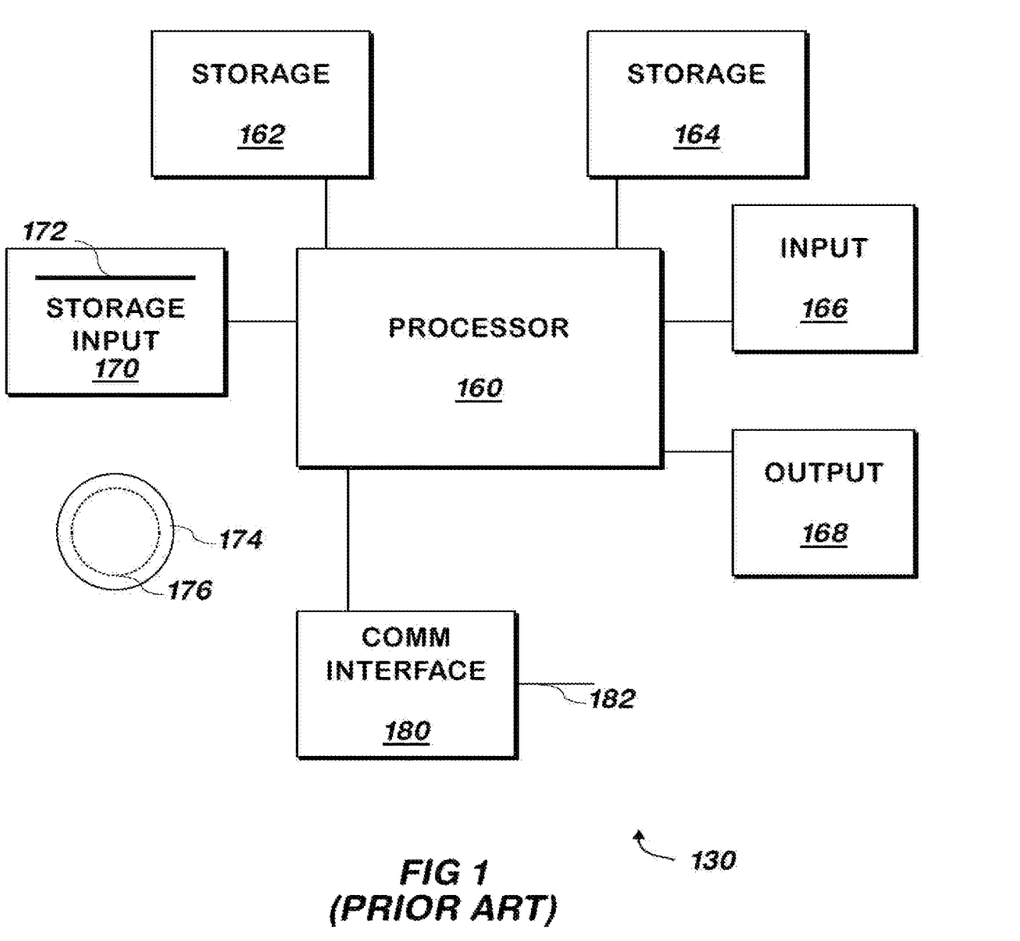
FIG. 1 is a block schematic diagram of a conventional computer system.

The present invention may be implemented as computer software running on a conventional computer system, or as a system of hardware and/or software. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output, and may include a conventional computer hardware processor. The only nonce word used as such is the term "means", all other terms that could be interpreted as a nonce term that are used in a system are not nonce terms but imply structure.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2:
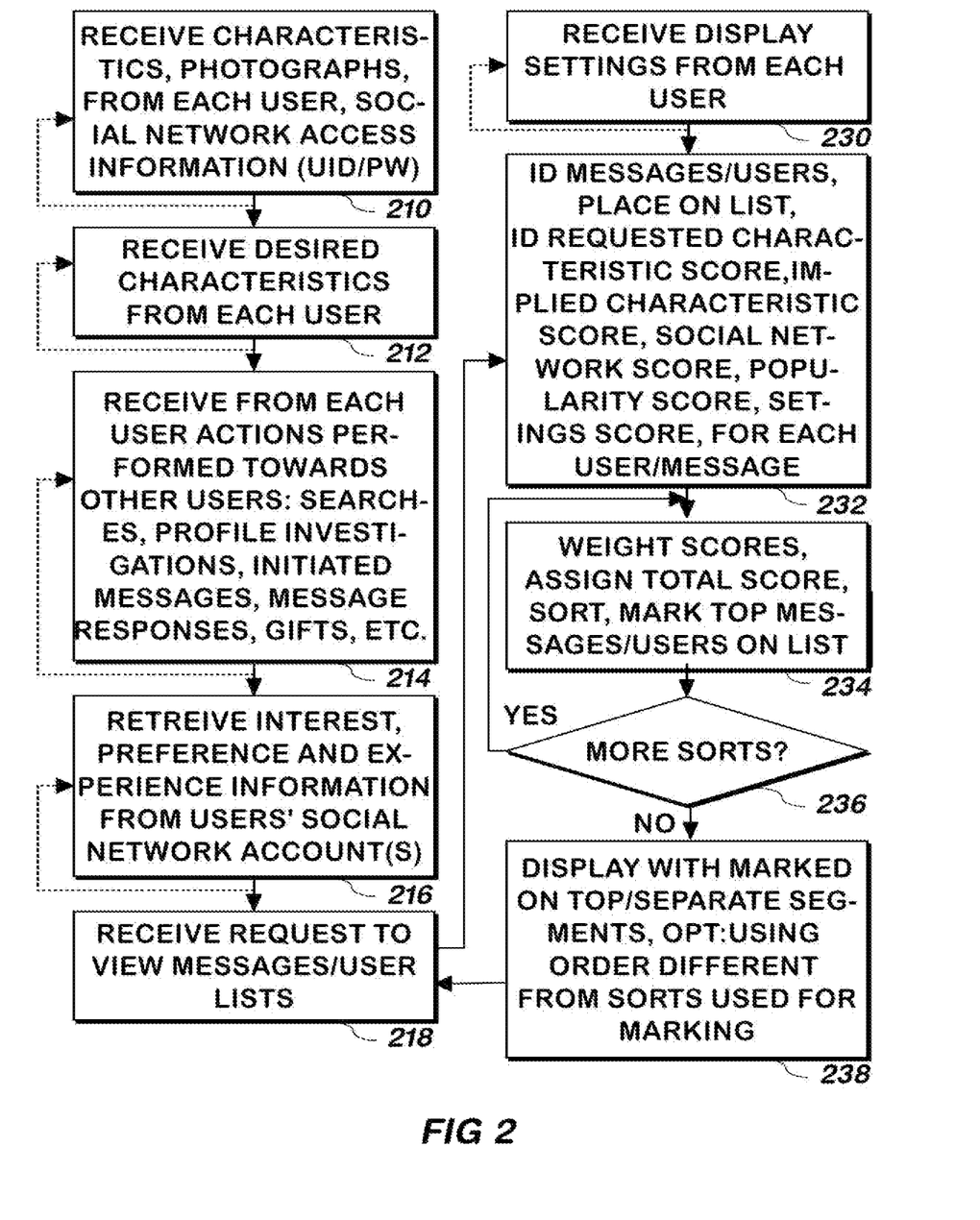
FIG. 2 is a flowchart illustrating a method of displaying a list of messages or users according to one embodiment of the present invention.

Referring now to FIG. 2, a method of displaying lists of messages or users is shown according to one embodiment of the present invention. Characteristics of each user are received and stored associated with an identifier of that user 210. Characteristics may include demographic information, such as height, weight, hair color, eye color, age or age range, sexual preference, or other similar information. Characteristics may also include descriptions of the user's interests and experiences or other information provided by the user to described themselves. As part of step 210, photographs of the user may be received and stored associated with the user identifier. In one embodiment, social network access information, such as a user identifier and a password that may be used to allow a user to log in to a social network, or otherwise retrieve information from the social network, may also be received from the user for use as described below.

Characteristic values of other users that are desired by the user may be received from each user 212. The values of characteristics received from a user in step 212 may correspond to the characteristics received in step 210. For example, a user may specify a particular age range or age ranges of other users in which the user is interested. Any number of desired characteristic values may be received from each of any number of users, and such information is stored associated with the user from which it was received.

Steps 210 and 212 may be updated at any time by the user as indicated by the dashed lines in the Figure.

Each user may perform actions with respect to other users, and such actions, and details associated with such action are received and stored associated with the user performing action, and the date and time that such action was performed 214. In one embodiment, actions include searching other users by entering characteristic values as search parameters, investigating users' profiles, such as by clicking on a user identifier or information associated with the user identifier when such users are listed in search results, initiating messages to a user, replying to messages from a user, giving gifts or other indications of interest to the user, and other similar actions. Any number of such action may be performed by number of users at any time as indicated by the dashed line in the Figure.

Interest, preference, and experience information may be retrieved from the social network accounts corresponding to the social network access information received in step 210 as described in the related application, using such social network access formation, and stored associated with the user identifier corresponding to such social network access identifier, along with the current date and time.

At any time, a request to view messages or specific lists of users may be received 218. Messages may include e-mail messages received, e-mail messages sent, e-mail messages received to which a reply was sent, chat messages, or notifications of interest in the user by a different user, such as receipt of a gift, or other indication of interest. User lists may include lists of other users who viewed the user's photographs and/or characteristic information (referred to as the user's profile) other users who made a connection to the user making the request, and/or users to which that user made a connection. A connection may include in a message sent or replied to, or explicit indications of interest sent or received, such as gifts or other indications of interest. The method continues at step 232.

In one embodiment, the user may supply display settings at any time for use as described herein. In one embodiment, display settings include one or more sets of one or more characteristic values that are used to segregate messages or lists of users as described herein. For example, a user may identify a value of hair color of red, brown or blonde to use as the first set of characteristic values in the display settings, and a value of age in a range of 25 to 30 and height in a range of 5 foot 10 to 6 foot 2 to use as the second set of characteristic values in the display settings. Display settings may also include a time period to use for the segregation of messages as described herein.

At step 232, users or messages corresponding to the request of step 218 are identified and placed on a list, and a requested characteristic score, and implied characteristic score, a social network score, a popularity score, and one or more settings scores corresponding to each of the sets of characteristic values specified by the user as described above are calculated for each user in the list, or messages in the list, requested in step 218.

The requested characteristic score is a score that identifies how closely the characteristics of the user in the list, or the user corresponding to the message in the list, matches the desired characteristics received in step 212 specified by the user making the request of step 218 as described above. A higher score indicates a closer match, and a lower score indicates a lesser match.

The implied characteristic score is a score that identifies how closely the characteristics of the user in the list, or the user corresponding to the message in the list, matches implied characteristics desired by the user making the request in step 218 as identified by actions the user took in multiple iterations of step 214. For example, if the user regularly searched for, clicked on the profiles of, and messaged, women over 30, two implied characteristics desired by the user is an age over 30, and a sex of female. Such implied characteristics may be different from the characteristics explicitly received from the user in step 212. Any and all actions taken by the user may be used to identify implied characteristics desired by that user. A higher implied characteristics score indicates a closer match.

The social network score is a score that identifies how similar the interests, preferences, and experiences of the user making the request of step 218 are to those of the user in the list or the user who sent the message in the list, as indicated by the social network information retrieved from both users social network accounts at a social network server system in step 216, as described in related application. A higher social network score indicates a greater similarity of interests, preferences or experiences as indicated by the related application.

The popularity score is a score that identifies the percentage of times that a user in the list, or user who sent a message in the list, receives actions of interest from other users when such other user views the user in the list. An action of interest may include clicking on a user's profile, messaging the user, responding to messages received by the user, initiating another indication of interest, or sending a gift to such user. For example, if user A makes a request and receives a list including user B, if users C, D, and E each clicked on user B's listing in other lists that they requested, and then messaged user B, user B would have a higher popularity score than if users C, D, and E had not performed such actions when user B appeared on lists that they requested.

The settings score is a score that identifies how closely the characteristics provided by a user on the list, or a user who sent a message in the list, match the characteristics specified by the user as a setting in step 230. A higher settings score indicates a closer match. There may be multiple settings scores if there were multiple sets of such characteristics received from the user who requested the list in step 218. For example, a first settings score is calculated for a first set of characteristics and a second settings score is calculated for a second set of characteristics, different from the first set. A user in a list or user corresponding to a message in a list may have a high first settings score and a low second settings score.

The scores are weighted by multiplying the weight for a score by each score for each message or user on the list, the products are summed to produce a total score, the total scores for each message or user on the list are sorted, and the top N (e.g. N=3 or N=10% of the number of messages or users on the list) messages or users on the list are marked 234. In one embodiment, the range of scores serves the same purpose as weights and so weighting the scores is not performed. The weights may be identified using conventional regression analysis to maximize interaction by the user with the user on the list. In one embodiment, weights are identified for many users in a region such as a country or a part of a country, and in another embodiment, weights are identified for each user with and without settings, with each set of characteristics in the settings being analyzed separately from the other sets of characteristics.

If the user specified at least one set of characteristics, two total scores are computed for each message or user on the list at the first iteration or the only iteration of step 234: one with the weight of all settings scores set to zero, and another with the weight of at least one settings score set to a value other than zero. The sorting and marking is performed for each total score computed. The number of list elements marked may be different for each of the two different total scores assigned to each message.

If the user specified multiple sets of characteristics as the settings received in step 230, one settings score is assigned a positive weight and the other settings scores have weights that are set to zero or a lower weight than the one setting, at each subsequent iteration of step 234. Each settings score will thus have its own set of weights, which will be different from the weights of the other settings scores. In one embodiment, the weights for each settings score will be 1 for that score and zero for the other settings scores and all other scores as well, except that there may be a set of tiebreaker weights to be applied to ties for the settings score in the top N or greater positions. Other values of weights for each settings score may be used. The weights are applied at each iteration of step 234.

In one embodiment, marking the messages or users on the list is performed by assigning one or more marks (one for each total score computed), for each iteration of step 234. Thus, a user or message on the list may be marked with a first mark at a first iteration, but marked or not marked with a second mark at a second iteration, with the weights differing as described above for each total score computed at each iteration.

Thus, if a user supplies no sets of characteristics in step 230, a single total score is computed for each message or user on the list. For each set of characteristics the user supplies in step 230, an additional total score is computed for each message or user on the list.

In one embodiment, If the number of marks or number of marks for an iteration is below a threshold, i.e. only two messages are marked but the threshold is three, and, in one embodiment, the iteration corresponds to a weight for a settings score greater than zero, a search is made for users with the set of characteristics in the set of characteristics corresponding to the nonzero settings weight of the iteration, optionally combined with one or more of the characteristics (e.g. a location) specified in step 212 by the user who made the request of step 218 or by the other users or both, e.g. a two-way match may be made. A user who meets the criteria of the search may be added to the list as someone the user who made the request of step 218 may wish to contact, or messages may be sent to one or more of such the users who meet the criteria suggesting that they message or otherwise express an interest in the user who provided the request of step 218, optionally in the manner corresponding to the request. For example, if the user specifies as a set of characteristics, men aged 30-35, with brown hair and blue eyes, and only one such user is on the list or one message from such a user is on the list, a separate search may be made for users whose characteristics match those supplied in the set, and whose explicitly desired (in step 212) or implicitly desired (identified from the user's actions performed in iterations of step 214) characteristics match those of the user who is requesting the list.

In one embodiment, the user may specify a setting in step 230 that marks only messages sent or received within a certain period of time, such as the last day, or users who are on the list of users because of an action taken within that period of time, and the marking of messages will be in accordance with such specification. For example, if the users on the list are users who performed a certain action or one of many actions, they will only be marked if they took such one or more actions that made them appear on the list within the specified period of time from the current time.

If there are more iterations 236, the method continues at step 234 using the weights for that iteration. In one embodiment, there is one iteration that uses a zero weight for all settings scores, and another one or more iterations that uses a greater than zero weight for at least one settings score, and there may be one such more iteration for each such settings score, with one of the settings scores weighted higher than the other at each iteration, for example, weighting the other settings scores at zero.

In one embodiment, the total score for an iteration is stored with the mark for an iteration, and also for messages or users not marked.

If there is only a single iteration (e.g. there were no settings corresponding to one or more sets of characteristics to use to display lists of messages or users as described herein), or there are no more iterations 236, the method continues at step 238.

At step 238, the list of messages or users is displayed, (for messages, each message is listed using a header, containing the username of the user corresponding to the message other than the user who made the request in step 218, a subject line from the message, and a date and time sent; for lists of users, each user is listed using the username of the user on the list, and one or more characteristics and one or more photographs), to represent each message or user on the list, with the marked messages displayed in each of one or more segments of the display, for example at the top of the list, with each of the one or more segments delineated from the others and from messages not marked. Thus, if message 17 and message 45 are marked in one iteration, and message 38 and message 63 are marked in another, the display of message headers may appear as follows:

Message header for message 17
Message header for message 45
Message header for message 38
Message header for message 63
Message headers for remaining messages In the above example, there are two segments displaying marked messages and a final segment displaying the remaining unmarked messages.

In one embodiment, messages or users within a segment are displayed in an order that is made without regard, or without primary regard, for the total score the message or user received for that segment, for example, sorting all messages within a segment based upon the time the last message from the user was received, or the last message to the user was sent; and for lists of users, sorting such users within a segment based upon the time the user performed the last action that caused them to appear on the list.

System.

Figure 3:
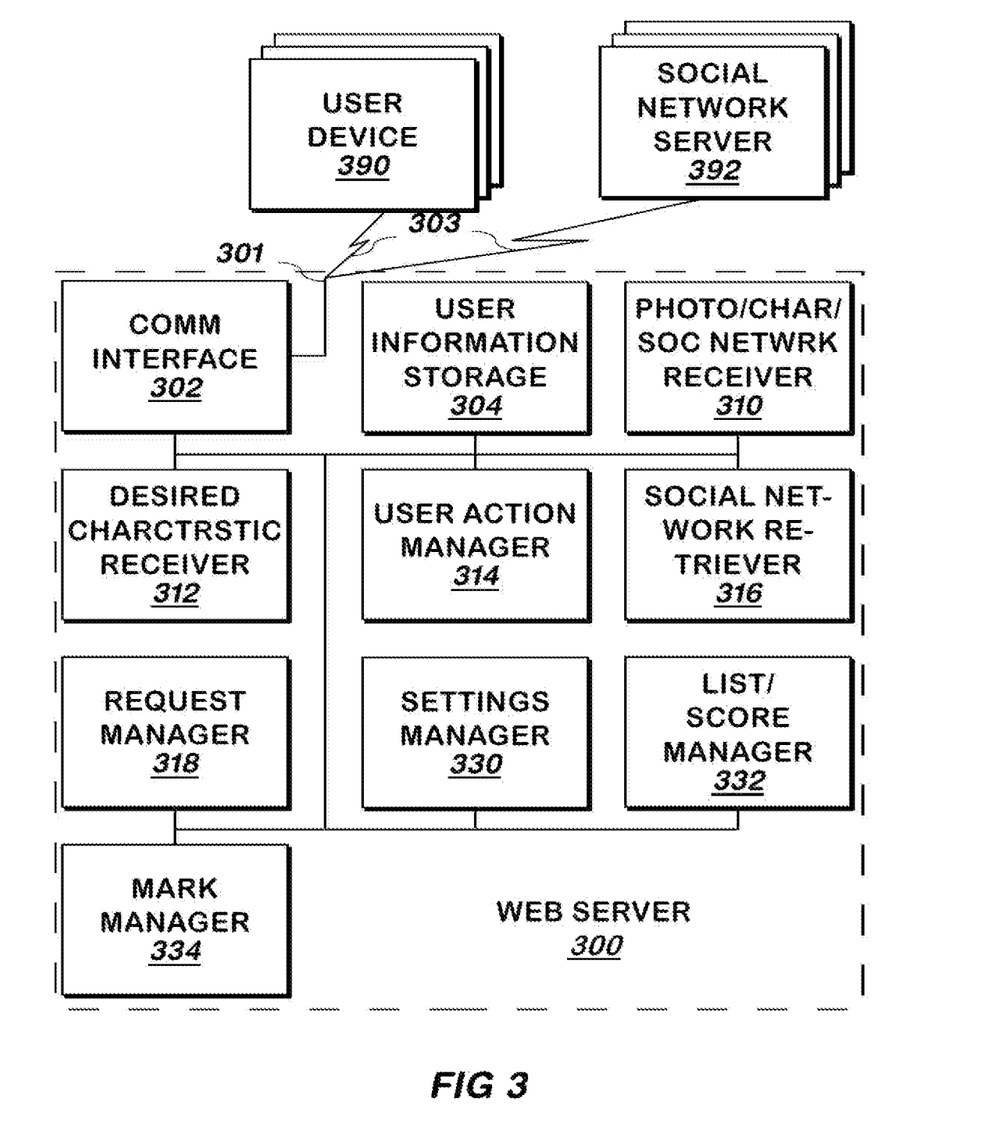
FIG. 3 is a block schematic diagram of a system for displaying a list of messages or users according to one embodiment of the present invention.

FIG. 3 is a block schematic diagram of a system for displaying lists of users and/or messages according to one embodiment of the present invention.

Referring now to FIG. 3, components of the system of FIG. 3 include web server 300, which includes one or more conventional web servers configured to operate as described herein, user devices 390, which may include conventional personal computer systems and smart devices such as smart phones or tablets, social network servers 392 such as servers from conventional social networks or other similar services, and network 303, which may include the Internet and one or more Ethernet networks, over which communication among such components are made. All elements of FIG. 3 have any number of inputs, outputs, and input/outputs with which to perform the functions described herein.

Communication interface 302 includes a conventional communication interface running suitable communication protocols such as TCP/IP, Ethernet or both, and has input/output 301 coupled to network 303. Unless specified otherwise, all external communication with web server 300 is made via input/output 301 of communication interface 302.

The user uses user device 390 to communicate with web server 300. There may be any number of such user devices 390 used by any number of users.

Photograph/characteristic/social network receiver 310 provides a user interface to allow the user to log in to web server 300, consisting of elements 301-334, using a user identifier and password that has been previously stored in user information storage 304. Photograph/characteristic/social network receiver 310 authenticates the user using conventional techniques, stores a cookie, or secure storage elements on the user device 390 containing a unique session identifier it generates at user log in, stores the session identifier associated with the user identifier in user information storage 304 and receives from the user, any number of characteristics, photographs, and social network access information for any number of social networks as described above, and stores such information in user information storage 304 associated with the user identifier. Other elements of server 300 may retrieve the session identifier, and use it to identify the user identifier corresponding to such session identifier in user information storage 304. Photograph/characteristic/social network receiver 310 provides user interface elements such as links or buttons to allow the user to update or add characteristics, photographs or social network access information (which Photograph/characteristic/social network receiver 310 receives and updates in user information storage 304), supply desired characteristics, perform other actions, and request lists of users or messages.

If the user clicks the user interface control to supply desired characteristics, the user interface on the user's device signals desired characteristic receiver 312. When signaled, desired characteristic receiver 312 obtains the user identifier of the user as described above, and provides a user interface to receive the desired characteristics of other users in which the user is interested as described above, and stores such desired characteristics into user information storage 304, associated with the user identifier of the user. As noted, the desired characteristics may be updated at any time using desired characteristic receiver 312, which receives and stores such updates into user information storage 304 associated with the user identifier of the user who supplied them.

If the user uses the user interface control to perform other actions, user action manager 314 is signaled, and provides a user-interface to allow the user to specify the action and any parameters associated with the action. User action manager 314 performs the indicated action, and records the date and time, action performed, the user identifier, and a user identifier of another user corresponding to the action, such as a recipient of the message in user information storage 304. Such other actions may be those described above, including those described with reference to step 214, and user action manager 314 may store other parameters of the action, such as the content of a message, a type of gift, or other information associated with the action, along with the other information it stores as described above. If the other action as a search, user action manager 314 may display search results (including username and one or more of the other user's photographs and characteristics), a portion at a time, such as a screen at a time, and user action manager 314 stores the user identifiers of such users who were displayed in the search results associated with the user in user information storage 304, along with the user identifier of the user performing the search, search parameters, and the date and time. Actions performed towards other users may include clicking on one of the users who are displayed as links in the search results, and user action manager 314 stores the identifier of the user clicked on along with the user identifier of the user who clicks on such user in user information storage 304 when user action manager 314 displays the characteristics and photographs of the user in response to the click. Such information may be used to identify the popularity score of the user clicked on, and to identify implied characteristics of the user her performed the click. All information stored by user action manager includes the date and time of the action.

Occasionally, social network retriever 316 retrieves social network information from all users accounts on social network servers 392, using the social network access information stored in user information storage 304. Social network retriever 316 stores the social network information retrieved from a user's account associated with the user identifier of that user in user information storage 304. Such information may be used to compute the social network score as described herein.

If the user clicks on the user interface control to allow the user to specify a request to view messages or lists of users, the user's device signals request manager 318. When so signaled, request manager 318 supplies a user interface to allow the user to specify the request to view messages or user lists, along with any parameters user may specify, such as characteristics of users the user wishes to view in the list, or types of messages such as those sent or received, short text type messages, indications of interest that do not contain text or may contain short text messages, or other similar parameters. When the user is finished specifying such parameters, or indicating the types of messages to view, the user may press a submit button supplied by request manager 318 in the user interface it supplies, in which case list/score manager 332 is signaled with the parameters or types of messages.

At any time, settings manager 330 may receive from each user, settings information including a period of time, and one or more sets of characteristic values to use to segregate messages into lists as described herein. Such period of time and the one or more sets of information are stored into user information storage 304 associated with the user identifier from which the settings information was received by settings manager 330.

When list/score manager 332 receives the parameters, list/score manager 332 uses the information in user information storage 304 to generate the list of messages or users in accordance with the parameters it receives. In one embodiment, lists of users are those who have made some connection with the user performing the list, such as sending an indication of interest, even if it is not reciprocated. In another embodiment, lists of users may also include searched users who may not have made any such prior connection with the user performing the search. List/score manager 332 stores the list into user information storage, associated with a unique identifier of the list it generates. In one embodiment, if a time period is specified as a setting, list/score manager 332 marks the users or messages on the list that correspond to the time period as described above, or only adds the users or messages to the list if such users or messages correspond to the time period.

List/score manager 332 generates, for each item on the list, the requested characteristic score, implied characteristic score, social network score, a popularity score, and settings score using information the user information storage 304 as described above. List/score manager 332 stores such scores with the elements of the list to which such scores correspond, and provides the list identifier to mark manager 334. If a period of time was specified in the settings, list/score manager 332 only applies settings scores to the elements of the list that meet the requirements of the period of time specified.

When it receives the list identifier, mark manager 334 marks the elements in the list as described above based on the scores and weights it applies as described above. Mark manager 334 may sort, and resort the list as required to identify the marked elements of the list as described above. In one embodiment, mark manager 334 only marks messages or users that were marked as corresponding to the time period as described above. Mark manager 334 signals request manager 318 when mark manager 334 has finished marking the list as described herein.

When signaled by mark manager 334, request manager 318 displays the list in segments according to the marks, and sorted within each segment as described above. In one embodiment, if an insufficient number of marks have been made for a segment relative to a threshold number, request manager 318 performs one or more of the actions described above, by listing users not marked but who would have been marked if they performed the action corresponding to the request (e.g. had they sent an e-mail to the user, they would have been marked), or by sending a message to one or more of such users suggesting they perform the action corresponding to the request (e.g. send an e-mail) for the user who sent the request. As noted, the user receiving such a suggestion may be one for which the user who sent the request has, according to one or more iterations of step 210, some or all of the desired characteristics of the user to whom the suggestion is sent, thereby making a mutual match. Request manager 318 stores the list and marks in user information storage 304 to allow the popularity score to be computed using that list.

The user may view the list and perform actions such as clicking on an element of the list, which signals user action manager 314 with the identifiers of the user clicked into user information storage 304, allowing user action manager to record the action, the user identifier of the two users (the user clicking and the user on whom that user clicked), and the current date and time. The user may e-mail the other user using a link that also signals user action manager 314, which receives the contents (including subject) of the e-mail, the sender and recipient and date and time and stores such information into user information storage 304 as described above. When the user logs into photograph/characteristic/social network receiver 310, it checks whether the user has any new e-mail messages and then displays a link to user action manager 314 to allow the user to read such messages. Links to user action manager 314 have sufficient information to allow it to perform the action, such as an indication as to what action is being requested, and if a user is a target of the action, an identifier of that target.

Request manager 318 displays a link to create a new request when it provides the segmented list, and if the user clicks the link, a new request may be specified, and the process is repeated. Any number of requests may be made, each with different specifications. Because of the popularity score, the score for a user on a list on a subsequent request may be influenced by the user's action towards that user on the prior list from the prior request.

Summary of Selected Embodiments

There is described a method of displaying two or more of messages, including: segregating the two or more messages, each sent by two or more of senders to a recipient, into two or more of different lists of two or more of messages, responsive to at least one of a set of factors including: A. a level of correspondence between a set of characteristics specified by the recipient of the two or more messages as corresponding to people the recipient would like to meet, and a set of characteristics specified by each sender of said message as corresponding to characteristics of that sender; B. a level of correspondence between a set of characteristics identified by monitoring two or more of different activities of the recipient of each of the two or more messages, towards two or more of third parties on a data repository operated for a business having electronic capabilities used by the sender and recipient of the two or more messages, and the set of characteristics specified by each sender of each of the two or more messages as corresponding to characteristics of that sender; C. a level of correspondence between interests, preferences and/or experiences of the sender of at least some of each of the two or more messages and the recipient of the two or more messages, said interests, preferences and/or experiences based on information having been retrieved from a repository of data provided for social networking purposes; D. a level of popularity of each sender of the two or more messages, identified by monitoring two or more of different activities of two or more of third parties towards said sender, on the data repository operated for the business having electronic capabilities used by the sender and recipient of the message; and E. a level of correspondence between a set of characteristics specified by the recipient of each of the two or more messages as corresponding to senders of messages including the two or more messages for whom the recipient of each of the two or more messages would like to segregate messages, and a set of characteristics specified by each sender of said message as corresponding to characteristics of that sender; and displaying the two or more messages in two or more of lists, responsive to the segregating step.

The method includes an optional feature whereby the at least one of the set of factors comprises factor A.

The method includes an optional feature whereby the at least one of the set of factors comprises factor B.

The method includes an optional feature whereby the at least one of the set of factors comprises factor C.

The method includes an optional feature whereby the interests, preferences and/or experiences are inferred based on information having been retrieved from a repository but are not identical to the information retrieved from the repository.

The method includes an optional feature whereby the at least one of the set of factors comprises factor D.

The method includes an optional feature whereby the at least one of the set of factors comprises factor E.

The method additionally including providing to the recipient of the two or more messages, an identifier of a person who has not sent a message to the recipient of the two or more messages responsive to at least one of the factors in the set.

A system for displaying two or more of messages is described, each message in the plurality having a sender different from other senders of messages in the plurality, and having a recipient, the system including: at least one component selected from a set of components including: a photograph/characteristic/social network receiver having an input for receiving a set of characteristics specified by each sender of the two or more messages as corresponding to characteristics of that sender, the photograph/characteristic/social network receiver for providing at an output the set of characteristics specified by each sender of the two or more messages; a desired characteristic receiver having an input for receiving a set of characteristics specified by the recipient of the two or more messages as corresponding to people the recipient would like to meet, the desired characteristic receiver for providing at an output the set of characteristics specified by the recipient of the two or more messages; a user action manager having an input coupled for receiving two or more of requests to perform two or more of different activities of at least one of: 1) the recipient of each of the two or more messages, towards two or more of third parties on, and 2) two or more of third parties towards the sender of each of the two or more messages on, on a data repository operated for the business having electronic capabilities used by the sender and recipient of the two or more messages, the user action manager for performing via an input/output said activities responsive to said requests, and for providing at an output at least one of: 1) a set of characteristics responsive to the two or more different activities of the recipient of the two or more messages, towards the two or more third parties, and 2) information about activities of the two or more third parties towards each sender of the two or more messages; a social network retriever having an input/output for retrieving from a repository of data provided for social networking purposes, a first set of information regarding interests, preferences and/or experiences of the sender of at least some of the two or more messages and the recipient of the two or more messages, the social network retriever for providing at an output a second set of information regarding interests, preferences and/or experiences of the sender of at least some of the two or more messages and the recipient of the two or more messages responsive to the first set of information regarding interests, preferences and/or experiences of the sender of at least some of each of the two or more messages and the recipient of the two or more messages; and a settings manager having an input for receiving a set of characteristics specified by the recipient of each of the two or more messages as corresponding to senders of messages including the two or more messages for whom the recipient of each of the two or more messages would like to segregate messages, the settings manager for providing at an output the set of characteristics specified by the recipient of each of the two or more messages as corresponding to senders of messages including the two or more messages for whom the recipient of each of the two or more messages would like to segregate messages; a list/score manager having an input coupled to at least one of: the photograph/characteristic/social network receiver output for receiving the set of characteristics specified by each sender of the two or more messages, to the desired characteristic receiver output for receiving the set of characteristics specified by the recipient of the two or more messages, to the user action manager output for receiving at least one of 1) the set of characteristics responsive to the two or more different activities of the recipient of the two or more messages, towards the two or more third parties and the recipient of the two or more messages and 2) the information about activities of the two or more third parties towards each sender of the two or more messages, to the social network retriever for receiving the second set of information regarding interests, preferences and/or experiences of the sender of at least some of the two or more messages and the recipient of the two or more messages, and to the settings manager output for receiving the set of characteristics specified by the recipient of each of the two or more messages as corresponding to senders of messages including the two or more messages for whom the recipient of each of the two or more messages would like to segregate messages, the list/score manager for assigning at least one score to the sender of each of the two or more messages and for providing at an output the at least one score for each sender of the two or more messages, responsive to at least one from a set of factors including: A. a level of correspondence between the set of characteristics specified by the recipient of the two or more messages as corresponding to people the recipient would like to meet, and the set of characteristics specified by the sender of said message as corresponding to characteristics of that sender; B. a level of correspondence between the set of characteristics responsive to the two or more different activities of the recipient of the two or more messages, towards the two or more third parties on the data repository operated for the business having electronic capabilities used by the sender of each of the two or more messages and the recipient of the two or more messages, and the set of characteristics specified by the sender of said message as corresponding to characteristics of that sender; C. a level of correspondence between information in the second set regarding interests, preferences and/or experiences of the sender of said message and that of the recipient of the two or more messages; D. a level of popularity of the sender of said message, identified by monitoring two or more of different activities of two or more of third parties towards said sender, on the data repository operated for the business having electronic capabilities used by the sender and recipient of the message; and E. a level of correspondence between the set of characteristics specified by the recipient of each of the two or more messages as corresponding to senders of messages including the two or more messages for whom the recipient of each of the two or more messages would like to segregate messages, and a set of characteristics specified by the sender of said message as corresponding to characteristics of that sender; and a request manager having an input for receiving the two or more messages and to the list/score manager output for receiving the at least one score for each sender of the two or more messages, the list/score manager for displaying the two or more messages in two or more of lists, responsive to at least some of the at least one score for each sender of the two or more messages.

The system includes an optional feature whereby the at least one of the set of factors comprises factor A.

The system includes an optional feature whereby the at least one of the set of factors comprises factor B.

The system includes an optional feature whereby the at least one of the set of factors comprises factor C.

The system includes an optional feature whereby the second set of information is inferred based on the first set of information retrieved from a repository but is not identical to the first set of information retrieved from the repository.

The system includes an optional feature whereby the at least one of the set of factors comprises factor D.

The system includes an optional feature whereby the at least one of the set of factors comprises factor E.

The system includes an optional feature whereby the request manager is additionally for providing to the recipient of the two or more messages at the request manager output, an identifier of a person who has not sent a message to the recipient of the two or more messages, responsive to at least one of the factors in the set.

A computer program product including a computer useable medium having computer readable program code embodied therein for displaying two or more of messages is described, the computer program product including computer readable program code devices configured to cause a computer system to: segregate the two or more messages, each sent by two or more of senders to a recipient, into two or more of different lists of two or more of messages, responsive to at least one of a set of factors including: A. a level of correspondence between a set of characteristics specified by the recipient of the two or more messages as corresponding to people the recipient would like to meet, and a set of characteristics specified by each sender of said message as corresponding to characteristics of that sender; B. a level of correspondence between a set of characteristics identified by monitoring two or more of different activities of the recipient of each of the two or more messages, towards two or more of third parties on a data repository operated for a business having electronic capabilities used by the sender and recipient of the two or more messages, and the set of characteristics specified by each sender of each of the two or more messages as corresponding to characteristics of that sender; C. a level of correspondence between interests, preferences and/or experiences of the sender of at least some of each of the two or more messages and the recipient of the two or more messages, said interests, preferences and/or experiences based on information having been retrieved from a repository of data provided for social networking purposes; D. a level of popularity of each sender of the two or more messages, identified by monitoring two or more of different activities of two or more of third parties towards said sender, on the data repository operated for the business having electronic capabilities used by the sender and recipient of the message; and E. a level of correspondence between a set of characteristics specified by the recipient of each of the two or more messages as corresponding to senders of messages including the two or more messages for whom the recipient of each of the two or more messages would like to segregate messages, and a set of characteristics specified by each sender of said message as corresponding to characteristics of that sender; and display the two or more messages in two or more of lists, responsive to the segregating step.

The computer program product includes an optional feature whereby the at least one of the set of factors comprises factor A.

The computer program product includes an optional feature whereby the at least one of the set of factors comprises factor B.

The computer program product includes an optional feature whereby the at least one of the set of factors comprises factor C.

The computer program product includes an optional feature whereby the interests, preferences and/or experiences are inferred based on information having been retrieved from a repository but are not identical to the information retrieved from the repository.

The computer program product includes an optional feature whereby the at least one of the set of factors comprises factor D.

The computer program product includes an optional feature whereby the at least one of the set of factors comprises factor E.

The computer program product additionally including the computer program product including computer readable program code devices configured to cause the computer system to provide to the recipient of the two or more messages, an identifier of a person who has not sent a message to the recipient of the two or more messages responsive to at least one of the factors in the set.

What is claimed is:

1. A computer-implemented method of displaying a plurality of messages, comprising:
    segregating by an electronic messaging system, performed by a specially programmed hardware computer processor coupled to a nontransitory memory, the plurality of messages sent by a plurality of senders to a recipient, into a plurality of different segments of the plurality of messages, responsive to at least one of a set of factors comprising:

A. a level of correspondence between a set of characteristics specified by the recipient of the plurality of messages as corresponding to people the recipient would like to meet, and a set of characteristics specified by each sender of said message as corresponding to characteristics of that sender;

B. a level of correspondence between a set of characteristics stated by each of at least some of the senders of the plurality of messages as being possessed by each said sender of the plurality, and a set of characteristics identified by monitoring a plurality of different searching, browsing or messaging activities of the recipient of each of the plurality of messages, towards each of a plurality of third parties on a data repository operated for a business having electronic capabilities used by the plurality of senders and recipient of the plurality of messages;

C. a level of correspondence between interests, preferences and/or experiences of the sender of each of at least some of each of the plurality of messages and the recipient of the plurality of messages, said interests, preferences and/or experiences inferred based on information having been retrieved from a repository of data provided for social networking purposes;

D. a level of popularity of each sender of the plurality of messages, identified by monitoring a plurality of different activities of a plurality of third parties towards said sender other than those involving messages of the sender, on the data repository operated for the business having electronic capabilities used by each sender and recipient of the plurality of messages; and E. a level of correspondence between a set of characteristics specified by the recipient of each of the plurality of messages as corresponding to senders of messages comprising the plurality of messages for whom the recipient of each of the plurality of messages would like to segregate messages, and a set of characteristics specified by each sender of said message as corresponding to characteristics of that sender; and providing for simultaneous display two or more of the messages from the plurality in each of the different segments responsive to the segregating step, each of the different segments displayed delineated from one another.

2. The method of claim 1, wherein the at least one of the set of factors comprises factor A.

3. The method of claim 1, wherein the at least one of the set of factors comprises factor B.

4. The method of claim 1, wherein the at least one of the set of factors comprises factor C.

5. The method of claim 1, wherein the at least one of the set of factors comprises factor D.

6. The method of claim 1, wherein the at least one of the set of factors comprises factor E.

7. The method of claim 1, additionally comprising providing to the recipient of the plurality of messages, an identifier of a person who has not sent a message to the recipient of the plurality of messages responsive to at least one of the factors in the set.

8. A system for displaying a plurality of messages, each message in the plurality having a sender different from other senders of messages in the plurality, and having a recipient, the system comprising:

at least one component selected from a set of components comprising:

a photograph/characteristic/social network receiver having an input for receiving a set of characteristics specified by each of the senders of the plurality of messages as corresponding to characteristics of that sender, the photograph/characteristic/social network receiver for providing at an output the set of characteristics specified by each sender of the plurality of messages;

a desired characteristic receiver having an input for receiving a set of characteristics specified by the recipient of the plurality of messages as corresponding to people the recipient would like to meet, the desired characteristic receiver for providing at an output the set of characteristics specified by the recipient of the plurality of messages as corresponding to people the recipient would like to meet;

a user action manager having an input coupled for receiving a plurality of requests to perform a plurality of different searching, browsing or messaging activities of at least one of: 1) the recipient of each of the plurality of messages, towards a plurality of third parties on, and 2) the plurality of third parties towards the sender of each of the plurality of messages on, a data repository operated for a business having electronic capabilities used by each sender and recipient of the plurality of messages, the user action manager for performing via an input/output said activities responsive to said requests, and for providing at an output at least one of: 1) a set of characteristics responsive to the plurality of different activities of the recipient of the plurality of messages, towards each of the plurality of third parties, and 2) information about activities of the plurality of third parties towards each sender of the plurality of messages;

a social network retriever having an input/output for retrieving from a repository of data provided for social networking purposes, a first set of information regarding interests, preferences and/or experiences of the sender of at least some of the plurality of messages and the recipient of the plurality of messages, the social network retriever for providing at an output a second set of information regarding interests, preferences and/or experiences of the sender of at least some of the plurality of messages and the recipient of the plurality of messages responsive to the first set of information regarding interests, preferences and/or experiences of the sender of at least some of each of the plurality of messages and the recipient of the plurality of messages; and a settings manager having an input for receiving a set of characteristics specified by the recipient of each of the plurality of messages as corresponding to senders of messages comprising the plurality of messages for whom the recipient of each of the plurality of messages would like to segregate messages, the settings manager for providing at an output the set of characteristics specified by the recipient of each of the plurality of messages as corresponding to senders of messages comprising the plurality of messages for whom the recipient of each of the plurality of messages would like to segregate messages;
a list/score manager on an electronic messaging system comprising a hardware computer processor, and having an input coupled to at least one of:
   the photograph/characteristic/social network receiver output for receiving the set of characteristics specified by each sender of the plurality of messages;
   the desired characteristic receiver output for receiving the set of characteristics specified by the recipient of the plurality of messages as corresponding to people the recipient would like to meet;
   the user action manager output for receiving at least one of 1) the set of characteristics responsive to the plurality of different searching, browsing or messaging activities of the recipient of the plurality of messages, towards the plurality of third parties and the recipient of the plurality of messages and 2) the information about activities of the plurality of third parties towards each sender of the plurality of messages;
   the social network retriever output for receiving the second set of information regarding interests, preferences and/or experiences of the sender of at least some of the plurality of messages and the recipient of the plurality of messages; and
   the settings manager output for receiving the set of characteristics specified by the recipient of each of the plurality of messages as corresponding to senders of messages comprising the plurality of messages for whom the recipient of each of the plurality of messages would like to segregate messages;
the list/score manager for assigning at least one score to the sender of each of the plurality of messages and for providing at an output the at least one score for each sender of the plurality of messages, responsive to at least one from a set of factors comprising:
   A. a level of correspondence between the set of characteristics specified by the recipient of the plurality of messages as corresponding to people the recipient would like to meet, and the set of characteristics specified by the sender of said message;
   B. a level of correspondence between a set of characteristics stated by each of at least some of the senders of the plurality of messages as being possessed by each said sender of the plurality, and the set of characteristics identified responsive to the plurality of different searching, browsing or messaging activities of the recipient of the plurality of messages, towards each of a plurality of third parties on the data repository operated for the business having electronic capabilities used by the sender of each of the plurality of messages and the recipient of the plurality of messages;
   C. a level of correspondence between information inferred from, but not identical to, the second set of information regarding interests, preferences and/or experiences of the sender of said message and those of the recipient of the plurality of messages;
   D. a level of popularity of the sender of said message, identified by monitoring a plurality of different activities of a plurality of third parties towards said sender other than those involving messages of the sender, on the data repository operated for the business having electronic capabilities used by each sender and recipient of the plurality of messages; and
   E. a level of correspondence between the set of characteristics specified by the recipient of each of the plurality of messages as corresponding to senders of messages comprising the plurality of messages for whom the recipient of each of the plurality of messages would like to segregate messages, and a set of characteristics specified by the sender of said message as corresponding to characteristics of that sender; and
a request manager having an input for receiving the plurality of messages and to the list/score manager output for receiving the at least one score for each sender of the plurality of messages, the request manager for providing at an output for simultaneous display, two or more of the messages from the plurality in each of a plurality of different segments, to which the plurality of messages is assigned by the request manager responsive to at least some of the at least one score for each sender of the plurality of messages, each of the different segments including delineations from one another.

9. The system of claim 8, wherein the at least one of the set of factors comprises factor A.

10. The system of claim 8, wherein the at least one of the set of factors comprises factor B.

11. The system of claim 8, wherein the at least one of the set of factors comprises factor C.

12. The system of claim 8, wherein the at least one of the set of factors comprises factor D.

13. The system of claim 8, wherein the at least one of the set of factors comprises factor E.

14. The system of claim 8, wherein the request manager is additionally for providing to the recipient of the plurality of messages at the request manager output, an identifier of a person who has not sent a message to the recipient of the plurality of messages, responsive to at least one of the factors in the set.

15. A computer program product comprising a nontransitory computer useable medium having computer readable program code embodied therein for displaying a plurality of messages, the computer program product comprising computer readable program code devices configured to cause a computer system comprising an electronic messaging system to:
   segregate the plurality of messages sent by a plurality of senders to a recipient, into a plurality of different segments of the plurality of messages, responsive to at least one of a set of factors comprising:
      A. a level of correspondence between a set of characteristics specified by the recipient of the plurality of messages as corresponding to people the recipient would like to meet, and a set of characteristics specified by each sender of said message as corresponding to characteristics of that sender;
      B. a level of correspondence between a set of characteristics stated by each of at least some of the senders of the plurality of messages as being possessed by each said sender and a set of characteristics identified by monitoring a plurality of different searching, browsing or messaging activities of the recipient of each of the plurality of messages, towards each of a plurality of third parties on a data repository operated for a business having electronic capabilities used by the plurality of senders and recipient of the plurality of messages;
      C. a level of correspondence between interests, preferences and/or experiences of the sender of at least some of each of the plurality of messages and the recipient of the plurality of messages, said interests, preferences and/or experiences inferred based on information having been retrieved from a repository of data provided for social networking purposes;

D. a level of popularity of each sender of the plurality of messages, identified by monitoring a plurality of different activities of a plurality of third parties towards said sender other than those involving messages of the sender, on the data repository operated for the business having electronic capabilities used by the plurality of senders and recipient of the plurality of messages; and E. a level of correspondence between a set of characteristics specified by the recipient of each of the plurality of messages as corresponding to senders of messages comprising the plurality of messages for whom the recipient of each of the plurality of messages would like to segregate messages, and a set of characteristics specified by each sender of said message as corresponding to characteristics of that sender; and provide for simultaneous display two or more of the messages from the plurality in each of the different segments responsive to the computer readable program code devices configured to cause the computer system to segregate, each of the different segments displayed delineated from one another.

16. The computer program product of claim 15, wherein the at least one of the set of factors comprises factor A.

17. The computer program product of claim 15, wherein the at least one of the set of factors comprises factor B.

18. The computer program product of claim 15, wherein the at least one of the set of factors comprises factor C.

19. The computer program product of claim 15, wherein the at least one of the set of factors comprises factor D.

20. The computer program product of claim 15, wherein the at least one of the set of factors comprises factor E.

21. The computer program product of claim 15, additionally comprising the computer program product comprising computer readable program code devices configured to cause the computer system to provide to the recipient of the plurality of messages, an identifier of a person who has not sent a message to the recipient of the plurality of messages responsive to at least one of the factors in the set.

* * * * *